(12) United States Patent
Schneider

(10) Patent No.: US 8,177,164 B2
(45) Date of Patent: May 15, 2012

(54) INFILL PANEL OF A SUPPLY ARRANGEMENT IN A PASSENGER CABIN

(75) Inventor: Uwe Schneider, Jork Koenigreich (DE)

(73) Assignee: Airbus Operations GmbH (DE)

( * ) Notice: Subject to any disclaimer, the term of this patent is extended or adjusted under 35 U.S.C. 154(b) by 452 days.

(21) Appl. No.: 12/464,981

(22) Filed: May 13, 2009

(65) Prior Publication Data

US 2009/0283633 A1 Nov. 19, 2009

Related U.S. Application Data

(60) Provisional application No. 61/127,419, filed on May 13, 2008.

(30) Foreign Application Priority Data

May 13, 2008 (DE) .......................... 10 2008 023 318

(51) Int. Cl.
*B64D 11/00* (2006.01)
(52) U.S. Cl. ................... 244/118.5; 244/118.6
(58) Field of Classification Search ............... 244/118.5, 244/118.6, 1 N; 248/918, 919
See application file for complete search history.

(56) References Cited

U.S. PATENT DOCUMENTS

| | | | |
|---|---|---|---|
| 5,145,128 A * | 9/1992 | Umeda | 244/118.5 |
| 5,556,332 A * | 9/1996 | Schumacher | 454/76 |
| 6,764,046 B2 * | 7/2004 | Itakura et al. | 244/118.5 |
| 7,121,510 B2 * | 10/2006 | Ritts | 244/118.5 |
| 7,516,919 B2 * | 4/2009 | Young et al. | 244/118.5 |
| 7,567,186 B2 * | 7/2009 | Endress et al. | 340/945 |
| 2005/0116103 A1 * | 6/2005 | Harasta | 244/118.5 |
| 2011/0011976 A1 * | 1/2011 | Goehlich et al. | 244/118.5 |
| 2011/0133028 A1 * | 6/2011 | Riedel et al. | 244/118.5 |

FOREIGN PATENT DOCUMENTS

| | | |
|---|---|---|
| DE | 1198680 B | 8/1965 |
| DE | 4301681 C1 | 10/1994 |
| DE | 102006009629 A1 | 10/2007 |
| DE | 102006049030 B3 | 4/2008 |
| EP | 1288123 A2 | 3/2003 |
| EP | 1452397 A1 | 9/2004 |

* cited by examiner

*Primary Examiner* — Christopher P Ellis
(74) *Attorney, Agent, or Firm* — Lerner, David, Littenberg, Krumholz & Mentlik, LLP

(57) ABSTRACT

A supply device in a passenger cabin, such as an aircraft passenger cabin, includes a first panel or "function panel" having one or more comfort elements, operating elements, visual display elements, and communication elements; and a second panel or an "infill panel", which includes flexible supply channels. The panels are guided and lined up in a rail system of a PSC channel that is arranged in the direction of flight above a passenger seat row. The function panels are individually positionable in the PSC channel relative to the passenger seat row, wherein the infill panel synchronously follows a linear actuating movement of the function panel, and in this process automatically compensates for the distance dimension $S_1$ between function panels that are positioned so as to be spaced apart from each other.

26 Claims, 3 Drawing Sheets

INFILL PANEL OF A SUPPLY ARRANGEMENT IN A PASSENGER CABIN

CROSS-REFERENCE TO RELATED APPLICATIONS

This application claims the benefit of the filing date of U.S. Provisional Patent Application No. 61/127,419 filed May 13, 2008, the disclosure of which is hereby incorporated herein by reference.

BACKGROUND OF THE INVENTION

The invention relates to the arrangement of a supply device for passengers, in particular in an aircraft passenger cabin. Said device may comprise a first panel, associated with each passenger seat row, which panel is referred to as a "function panel" and may comprise safety elements, comfort elements and visual display elements as well as communication means. Furthermore the supply device may comprise a second panel, in which in particular flexible supply channels may be integrated, which panel may be referred to as an "infill panel". These panels may be guided in a rail system of a PSC channel (Passenger Service Channel) so that they may be spaced apart from each other.

From DE 43 01 681 C1 a passenger cabin of an aircraft is known in which the supply device may be positioned underneath the hatracks, flush mounted with the cabin panel surfaces. To this effect a lowered shaft-like PSC channel may have been arranged in the cabin panel surfaces above the passenger seat rows, in which PSC channel the entire supply device can be positioned so as to be slidable. The function panel and the infill panel may be integrated in the supply device so as to form a construction unit. After completion of adjustment, neither a cover nor a trim may be provided for the spaces that have been formed between two supply devices.

A generous spatial appearance as well as an easy accessibility to all the supply devices from each seating position in the passenger cabin may be characteristics for passenger wellbeing in an aircraft. For each aircraft layout the supply devices, in particular their function panels within the passenger cabin, may be arranged according to the particular seating position. Any change in the seating layout may require a matched repositioning of the function panels so that from its seat a passenger may use every functionality and in order to make possible optimum handling of all the devices. This may require a considerable additional installation-and maintenance effort in the case of the construction units or the designs of the supply devices currently used. In order to compensate for resulting distance dimensions between the function panels it is known to use so-called non-functional infill panels with different lengths, which may be slidably held and may be locked in position by way of retainers. This may require a large number of infill panels of different length, which large number may increase the multitude of different variants. The use of such infill panels may have ramifications for the entire componentry of the PSC channel as far as its multitude of different variants, interface concepts and gap concepts are concerned. A further known solution for adapting the infill panel to different distance dimensions may provide for the use of telescopic plastic infill panels that may include rigid plastic cassettes. This solution may be mechanically complex and visually unattractive.

There may be a need to provide an infill panel for a supply device, which infill panel may compensate for various distance dimensions between two function panels spaced apart from each other.

BRIEF SUMMARY OF THE INVENTION

According to an exemplary embodiment of the present invention, as stated in claim 1, the universal function panels may be individually positioned in the PSC channel relative to the passenger seat rows. A resulting distance dimension between two spaced-apart function panels may be compensated for by an infill panel of uniform design that synchronously may follow the linear actuating movement of the function panels by flexible length adjustment. The infill panel according to the invention, which can also be referred to as a length compensation element may make possible, without any additional components and without manual intervention, automatic compensation for the distance dimension between two function panels. In this arrangement, the sections of the infill panel that represent the length compensation may be adequately guided both during retraction and during extension. An infill panel designed according to the invention may make it possible to compensate for all distance dimensions that may occur between two function panels that are spaced apart. Consequently, the arrangement of function panels in the PSC channel may not require any compensation using individually designed fixed infill panels or additional components for individual aircraft layouts. For reconfiguration, the aircraft operator thus may not have to exchange components and may not require any new components, which at the same time may reduce component holdings, thus providing a cost advantage. According to the invention, the PSC channel alternately may comprise universal function panels that may be directly associated with the passenger seat rows, and infill panels that may be designed according to the invention. If an aircraft operator changes the distance between passenger seat rows, then the function panels may be moved into the desired position of the passenger seat row, so that the lengths between the function panels in the x-direction of the aircraft may change over the entire PSC channel. The resulting distance dimensions may be automatically compensated for by the infill panels by flexible length adjustment.

According to a further exemplary embodiment of the present invention, the end regions of the PSC channel may be delimited by an end panel. In order to compensate for the length of an arising distance dimension between the end panel and the first function panel, an infill panel according to the invention may also be used.

According to a further exemplary embodiment of the present invention, the infill panel according to the invention may form a modular interior equipment component. The infill panel may thus be used in several aircraft types for various fuselage cross-section sizes. By using equipment components that can be used in several aircraft types, said components may be produced in larger numbers so that the proportional tooling costs and consequently also the unit costs may be reduced. As far as the aircraft operators are concerned, this also may result in reduced spare parts holdings and in simplified as well as uniform maintenance procedures.

According to a further exemplary embodiment of the present invention, the infill panel may form a roller blind that may be also referred to as a cover roller blind, compensation roller blind or intermediate roller blind. The design of the infill panel that is designed as a roller blind may comprise a transverse brace that may be guided in the rail system of the PSC channel, to which transverse brace on each side, spaced apart, a tensioning roller may be allocated, with said tensioning rollers being individually adjustable in a linear manner for the purpose of length compensation. As an alternative to tensioning rollers, tensioning brackets may be used, which towards the side of the passenger seats may be connected with a fabric panel or a foil panel. The fabric panel may enclose the tensioning roller or the tensioning bracket by 180 degrees and on the opposite side may form two ends of the fabric panel which with the use of a spring means may be connected to the transverse brace so as to be elastically pre-tensioned. This construction of the infill panel may make possible new designs, and may create a PSC channel that is visually positively changed, which PSC channel may have an advantageous effect on the overall appearance of the passenger cabin.

According to a further exemplary embodiment of the present invention, in each case the tensioning roller of the infill panel may be attached to a function panel by way of attachment elements that may be arranged on the ends. In order to achieve a non-positive locking and form closed attachment, in particular resiliently pre-tensioned holding pins may be suitable, by means of which holding pins permanent linkage of the tensioning roller to the infill panel may be ensured.

According to a further exemplary embodiment of the present invention, in each case the tensioning brackets may be connected to the transverse brace of the infill panel by way of a pusher device. The pusher device, which independently of the movement device may form a support structure for the tensioning bracket, may ensure that the fabric panel may be always adequately pre-tensioned. In this arrangement the force of the pusher device may exceed the force of the spring means that may be used between the end of the fabric panel and the transverse brace. This design may make possible an always intended simultaneous adaptation of the position of the tensioning bracket to that of the function panel. In order to design the pusher device the latter may comprise two compression bars by way of which compression bars each tensioning roller or as an alternative each tensioning bracket may be connected to the transverse brace.

According to a further exemplary embodiment of the present invention, the transverse brace of the infill panel may be used to retain spring elements and actuator elements by means of which, in connection with the compression bars, an intended spreading apart between the transverse brace and the tensioning roller or the tensioning bracket may be achieved. Each tensioning bracket may be associated with two offset compression bars that are connected, by way of joints, on the one hand to an actuator element that may be integrated in the transverse brace designed as a hollow body, and on the other hand to the tensioning bracket. Accordingly, the actuator elements may be impinged upon by a spring element that may be also inserted in the transverse brace. In order to increase the spreading force of the pusher device, it is proposed the supplementary use of resilient joints.

According to a further exemplary embodiment of the present invention, in order to create a form closed retainer, the control panel may comprise a contact zone that may be essentially concave, which contact zone the tensioning bracket or the tensioning roller of the infill panel may engage. In this arrangement functional installation clearance may be maintained in order to prevent the fabric panel or film panel from directly contacting the function panel. This may result in at least a partial coverage between the function panel and the end structure of the infill panel in the region of the tensioning roller or of the tensioning bracket, so that an almost gapless transition between the individual panels may arise.

According to a further exemplary embodiment of the present invention, a longitudinal dimension of the infill panel according to the invention may exceed a distance dimension between two function panels spaced apart from each other. As a result of the dimensioning and the interlocking of these components, tight gap concepts may be realised, which also may contribute to avoiding a visible slot between the panels. In this way the visual appearance of the PSC channel may be enhanced.

According to a further exemplary embodiment of the present invention, the tensioning roller or the tensioning bracket of the infill panel may be supported on the function panel by way of a friction-reducing gliding element or rolling element. This design may be preferably suitable for infill panels whose tensioning roller or tensioning brackets may be impinged upon by a pusher device in order to stop a direct support of the fabric panel or a foil panel. In particular in the case of frequent sliding of the function panel the friction-reducing elements may prevent visible wear traces on the fabric panel, which wear traces may arise as a result of direct support on the function panel. For example, guide rollers that may be axially offset relative to each other, on which guide rollers the tensioning roller or the tensioning bracket may supported by line contact, may be suitable as friction-reducing elements.

According to a further exemplary embodiment of the present invention, the function panels, the end panels as well as the infill panels may be each guided in the rail system of the PSC channel by way of at least two attachment elements. Preferably, elements that may be designed in a T-shape and that may engage a longitudinal slot of the rail system may be suitable as attachment elements. For the purpose of simple adjustment and displacement, the contact surfaces of the attachment elements and/or of the rail system may comprise a friction-reducing coating. For exact positioning in the PSC channel the individual panels may be, in particular, affixed by way of the attachment elements.

According to a further exemplary embodiment of the present invention, it may be proposed that the fabric panel of the infill panel that may be designed as a cover roller blind be designed so as to be variable. Within the PSC channel, preferably infill panels with different colours of the fabric panel may be provided so as to create an overall impression with a pleasing colour scheme. As an alternative or in addition to different colouration it may be proposed a variable structuring of the fabric panels of the infill panel.

According to a further exemplary embodiment of the present invention, the material used in the fabric panel or the foil panel of the infill panel may meet the criteria of DIN 4102, fire classification B1, regarding fire-retardant materials.

According to a further exemplary embodiment of the present invention, the infill panel according to the invention furthermore may include measures for targeted noise absorption or sound absorption. For this purpose, for example, flexibly designed insulation mats may be suitable that may be preferably placed in a space that may be delimited by the fabric panels. Preferably an open-pore PU foam may be used as a material for the insulation mats.

According to a further exemplary embodiment of the present invention, for sound absorption or noise absorption the infill panel further may include the use of anti-noise-generating elements. To this effect the concept according to the invention may comprise actuators that may be designed as piezo exciters, which actuators may be preferably located on the transverse brace of the infill panel.

According to a further exemplary embodiment of the present invention, according to the invention the panels that are aligned in the PSC channel may be arranged underneath the hatracks or baggage compartments that may be arranged in the upper region of the passenger cabin. The design, according to the invention, of the supply unit thus may not require any special adaptation but instead may be combined with a predetermined arrangement of hatracks or baggage compartments as well as an already existing rail system.

According to a further exemplary embodiment of the present invention, the supply device according to the invention may be intended for aircrafts. The passenger cabin of the aircraft may comprise a PSC channel that above a passenger seat row spaced apart in the direction of flight may be guided, preferably in a two-rail system. In the PSC channel the panels may be arranged so as to be individually slidable in a linear manner. A first panel, designated a function panel, may comprise safety elements, comfort elements, display elements and operating elements, as well as communications means. Furthermore, the PSC channel may comprise second panels, designated infill panels, which may be intended, in particular, for accommodating flexible supply channels and which at least in some regions synchronously may follow an actuating movement of the function panel. The design according to the invention of the infill panels may provide for said panels to automatically compensate for a distance dimension that may arise between function panels that are spaced apart.

According to the invention according to claim 19, furthermore a method for arranging and installing panels in a PSC channel of an aircraft passenger cabin may be provided, which method may involve the following steps. At first individual positioning and subsequent fastening relative to the passenger-seat rows of first panels, which may be designated function panels, may take place. These may include safety elements, comfort elements, operating elements and visual display elements, as well as communication means, for example a reading light, steward call button, air nozzle and oxygen mask. The second method-related step may take place synchronously to positioning or setting the function panels, in which step a resulting distance dimension between two positioned function panels may be compensated for. To this effect a second panel, designated an infill panel, may be used which may be intended in particular for accommodating flexible supply channels. The infill panel may be designed and arranged such that said panel synchronously may follow the actuating movements of the adjacent function panels and automatically may compensate for the distance dimension of the function panels by flexible length adjustment.

BRIEF DESCRIPTION OF THE DRAWINGS

Below, exemplary embodiments of the present invention are described with reference to the enclosed figures. The following are shown.

DETAILED DESCRIPTION

Figure 1:
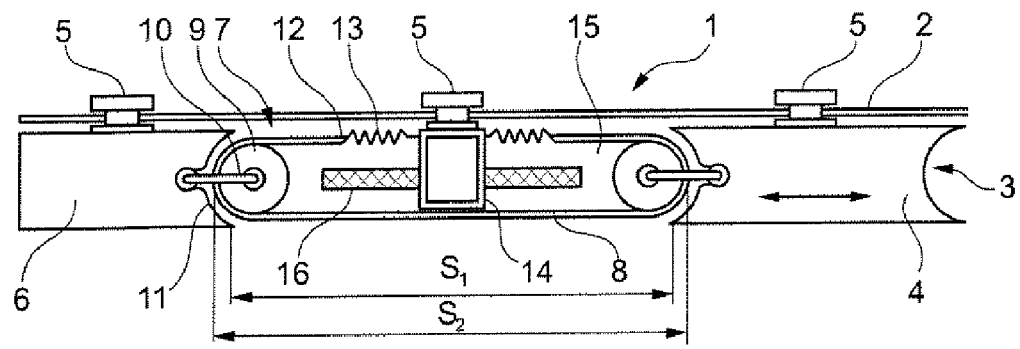
FIG. 1: an infill panel designed according to the invention, with the tensioning rollers of said infill panel being linked to a function panel or to an end panel.

In the following description of FIGS. 1 to 5, at least in part, the same reference characters are used for identical or corresponding components and elements.

Figure 6:
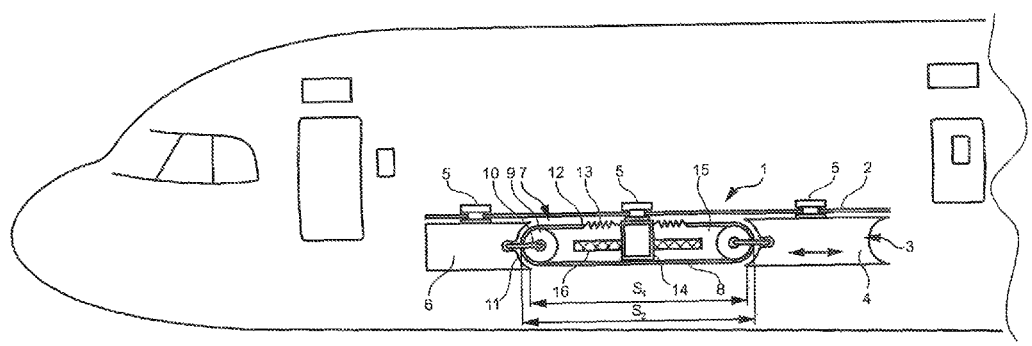
FIG. 6: the infill panel of FIG. 1 arranged within the interior of a passenger cabin of an aircraft.

FIG. 1 shows a lateral view of a supply device 1 that is arranged in a rail system 2 so as to be slidable in a linear manner. The rail system 2, which preferably comprises two guide rails, forms part of a PSC channel 3 that is positioned in a passenger cabin (shown in FIG. 6) of an aircraft, so as to be spaced apart from passenger seat rows, underneath the baggage compartments. The supply device 1 comprises different panels that are arranged in the PSC channel 3 side-by-side so as to be slidable. To each passenger seat row a first panel, designated a function panel 4, is allocated, which function panel 4 comprises safety elements, comfort elements, operating elements and visual display elements, as well as communication means for the passengers. In this arrangement the function panel 4 is guided in the rail system 2 by way of attachment elements 5 and is individually adjustable in order to achieve optimum view and control for passengers. A distance dimension "$S_1$" between spaced-apart function panels 4 or, as shown in FIG. 1, between an end panel 6 and a first panel, designated a function panel 4, is compensated for by a second panel, designated an infill panel 7. All the panels of the supply unit 1 are slidably guided, positioned and affixable in the rail system 2 by correspondingly designed attachment elements 5. The infill panel 7, also referred to as a "length compensation element" is designed as a roller blind that comprises a fabric panel 8 that connects two tensioning rollers 9 that are spaced apart from each other, wherein each tensioning rollers 9 are connected to the function panel 4 or to the start panel 6 by way of attachment pins 10. The infill panel 7 comprises two sections, each comprising a tensioning roller 9 and an associated part of the fabric panel 8, wherein these sections are adjustable simultaneously or independently of each other. Matched to the shape, the function panel 4 and the end panel 6 comprise an essentially concave retainer 11, which a tensioning roller 9, enclosed by the fabric panel 8, engages with a clearance. This arrangement causes a distance dimension "$S_1$" between the end panel and the function panel 4 to be exceeded by a longitudinal dimension "$S_2$" of the infill panel 7 so that in the transition region between the panels no visible gap arises. In order to achieve adequate initial tension, ends 12 of the fabric panel are linked, by way of two spring means 13 that are arranged offset in relation to each other, to a centrally positioned transverse brace 14 of the infill panel 7. By coupling the tensioning rollers 9 to the function panel 4 or to the start panel 6 by attachment pins 10, the infill panel 7 synchronously follows an actuating movement of the function panel 4 or of the end panel 6. As a measure for targeted noise absorption, in a space 15 of the infill panel 7, which space 15 is delimited by the fabric panel 8, elastically deformable insulation mats 16 have been put in place that on the ends are attached to the transverse brace 14.

Figure 2:
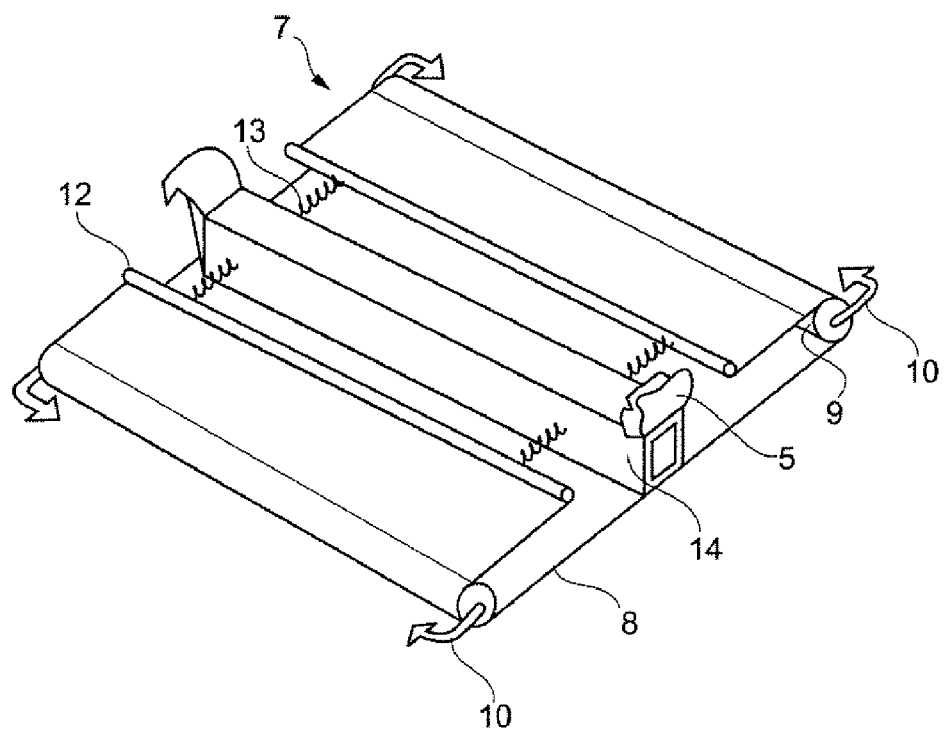
FIG. 2: a perspective view of the infill panel according to FIG. 1 as an individual component.

FIG. 2 shows a perspective view of the infill panel 7, showing details of the design. The transverse brace 14, designed as a rectangular hollow body, at each of its ends encompasses an attachment element 5 that engages the rail system 2. In order to achieve an evenly pre-tensioned fabric panel 8, the end 12 of the fabric panel is formed by a connecting rod to which the spring means 13, designed as a tension spring, are linked. The attachment pins 10 of the tensioning rollers 9, by way of which a connection to the function panels 4 is established, form a conical projection, which in the installed state, supported by a spring (not shown in FIG. 2) in a non-positive manner, for example engages a correspondingly formed borehole or conical recess of the function panel 4.

Figure 3:
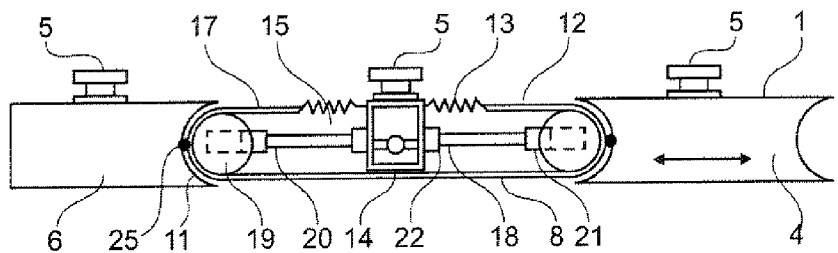
FIG. 3: an infill panel in the installed state, whose tensioning rollers are connected to a centrally positioned transverse brace by way of a pusher device.
Figure 4:
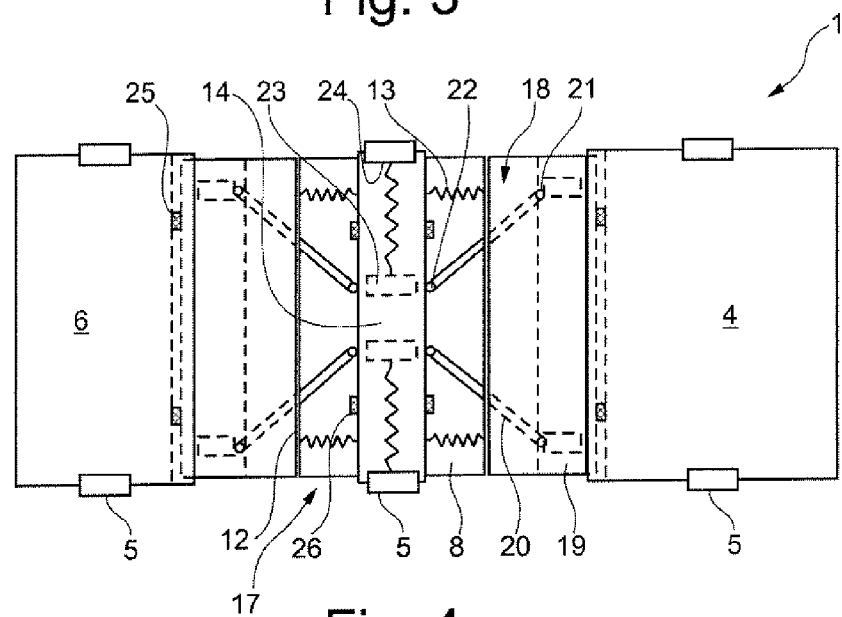
FIG. 4: a top view of the infill panel according to FIG. 3.
Figure 5:
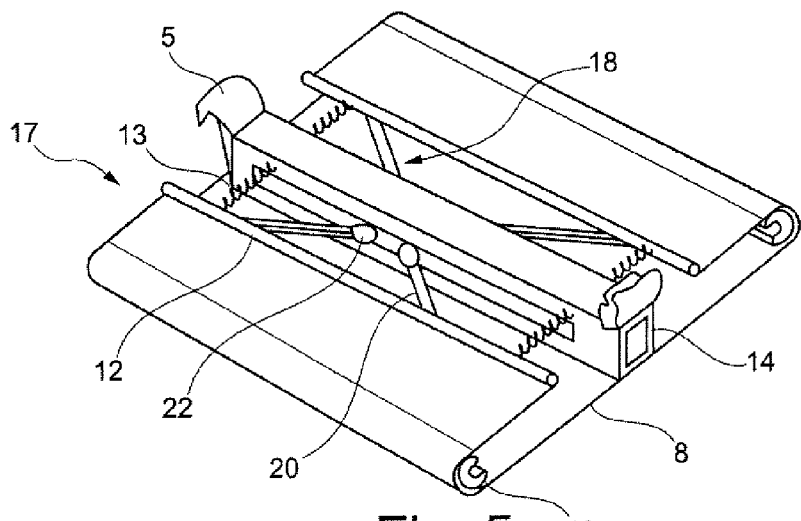
FIG. 5: a perspective view of the infill panel according to FIG. 3, as an individual component.

FIGS. 3 to 5 show the supply device 1 in conjunction with an alternative design of an infill panel 17. All the remaining components of the supply device 1 comprise corresponding reference characters according to FIG. 1. The subsequent description is limited to the different concept of the infill panel 17.

FIGS. 3 and 4 show the infill panel 17, which instead of comprising two tensioning rollers, comprises two tensioning brackets 19, which are connected to the transverse brace 14 by way of a pusher device 18. In order to spread the tensioning brackets 19 for the purpose of compensating for the distance dimension "$S_1$" between the function panel 4 and the end panel 6, the pusher device 18 in each case comprises compression bars 20 that are associated in pairs with the tensioning bracket 19. The compression bars 20, which at the same time form a support structure for the tensioning brackets 19, at their ends are connected each, by way of joints 21, 22 to the tensioning bracket 19 or to an actuator element 23 that is slidably guided in the transverse brace 14. Each actuator element 23 is associated with a spring element 24 that is designed as a tension spring for exerting a spreading force on the pusher device 18. In this way, if one or both function panels 4 are displaced, automatic simultaneous repositioning of the tensioning brackets 19 is achieved in order to compensate for the resulting distance dimension "$S_1$" between function panels 4 that are positioned adjacent to each other. In this arrangement the spreading force of the pusher device 18 exceeds the force of the spring means 13 used for initial tensioning of the fabric panel 8. This design makes it possible for the fabric panel 8 to always be supported directly in the region of the concave designed retainer 11 of the infill panel 7 or of the end panel 6. In order to prevent a large-area contact surface that forms a disadvantageously large friction contact, it is provided the arrangement of gliding elements 25 in the region of the retainer 11, wherein the tensioning brackets 19 are indirectly supported by said gliding elements 25 with line contact by way of the fabric panel 8. FIG. 4 shows the design of the pusher device 18 as well as the arrangement and the position of the gliding elements 25 in region of the retainer 11, which gliding elements 25 are offset relative to each other. To provide sound absorption the infill panel 7 comprises actuators 26 that are positioned laterally on the transverse brace 14 and that are used for counter-sound generation, which actuators 26 are designed as piezo exciters.

FIG. 5 shows a perspective view of the infill panel 7. The compression bars 20 of the pusher device 18, which compression bars 20 are arranged in a scissor-like manner, are connected to the actuator element 23 that is slidably guided in the transverse brace 14 by way of the joint 22. For simplified linking, the transverse brace laterally comprises a longitudinal slot 27, through which a connection between the joint 22 and the actuator element 23 leads.

In addition, it should be pointed out that "comprising" does not exclude other elements or steps, and "a" or "an" or "one" does not exclude a plural number. Furthermore, it should be pointed out that characteristics or steps which have been described with reference to one of the above exemplary embodiments can also be used in combination with other characteristics or steps of other exemplary embodiments described above. Also elements described in association with different embodiments may be combined. It should be noted that reference signs in the claims shall not be construed as limiting the scope of the claims.

List of reference characters

| | |
|---|---|
| 1 | Supply device |
| 2 | Rail system |

List of reference characters (continued)

| | |
|---|---|
| 3 | PSC channel |
| 4 | Function panel |
| 5 | Attachment element |
| 6 | End panel |
| 7 | Infill panel |
| 8 | Fabric panel |
| 9 | Tensioning roller |
| 10 | Attachment pin |
| 11 | Retainer |
| 12 | End of the fabric panel |
| 13 | Spring means |
| 14 | Transverse brace |
| 15 | Gap |
| 16 | Insulation mat |
| 17 | Infill panel |
| 18 | Pusher device |
| 19 | Tensioning bracket |
| 20 | Compression bar |
| 21 | Joint |
| 22 | Joint |
| 23 | Actuator element |
| 24 | Spring element |
| 25 | Gliding element |
| 26 | Actuator |
| 27 | Longitudinal slot |
| $S_1$ | Distance dimension |
| $S_2$ | Longitudinal dimension |

The invention claimed is:

1. A supply device for a passenger cabin, comprising:
two or more function panels comprising one or more of comfort elements, operating elements, visual display elements, and communication elements; and
one or more infill panels in which flexible supply channels are retained,
wherein the function and infill panels, lined up spaced apart from each other, are guided in a rail system of a PSC (Passenger Service Channel) channel so that they are slidable in the direction of flight, wherein the PSC channel is arranged above passenger seat rows, wherein the function panels are individually positioned in the PSC channel relative to the passenger seat rows, and wherein the infill panels comprise a flexible length compensation element that synchronously follows an actuating movement of the function panels to automatically compensate for a distance dimension $S_1$ between two function panels that are positioned so as to be spaced apart from each other.

2. The supply device of claim 1, wherein end regions of the PSC channel are delimited by an end panel, and wherein the end regions each interact with one of said one or more infill panels.

3. The supply device of claim 1, wherein the infill panels comprise a modular interior equipment component used in an aircraft for a plurality of fuselage cross-section sizes of the aircraft.

4. The supply device of claim 1, wherein the infill panels comprise:
a roller blind with a flexible fabric panel starting from a transverse brace, said roller blind further comprising first and second tensioning rollers spaced apart from each other, said tensioning rollers being individually adjustable in a linear manner,
wherein on the rail-system side, the fabric panel comprises two fabric panel ends that by way of a spring connection are connected to the transverse brace so as to be elastically pre-tensioned.

5. The supply device of claim 4, wherein at least one of the first and second tensioning rollers of the infill panels is attached to the function panel by attachment pins.

6. The supply device of claim 4, wherein the function panel comprises a substantially concave retainer, and wherein at least one of the first and second tensioning rollers of the infill panel engages said retainer with a clearance.

7. The supply device of claim 1, wherein a longitudinal dimension $S_2$ of the infill panels exceeds the distance dimension $S_1$ between two function panels that are positioned so as to be spaced apart from each other, or between an end panel and a function panel.

8. The supply device of claim 4, wherein each of the first and second tensioning rollers of the infill panel is supported on at least one gliding element that is associated with the retainer of the function panel.

9. The supply device of claim 1, wherein the function panels and the infill panels are guided and affixed in the rail system of the PSC channel by way of at least two attachment elements.

10. The supply device of claim 4, wherein the fabric panel of at least some infill panels inserted in the PSC channel vary in at least one of color and structure.

11. The supply device of claim 4, wherein the material of the fabric panel of the infill panel meets the criteria of DIN 4102 for the fire classification B1.

12. The supply device of claim 1, wherein flexible insulation mats are incorporated in the infill panel for sound absorption.

13. The supply device of claim 1, further comprising at least one actuator comprising a piezo exciter, said at least one actuator being integrated in the infill panel for counter-sound generation.

14. The supply device of claim 1, wherein the panels aligned in the PSC channel are arranged underneath hatracks that are arranged in the upper region of the cabin.

15. An aircraft comprising a supply device integrated in the passenger cabin, the supply device comprising:
two or more function panels comprising one or more of comfort elements, operating elements, visual display elements, and communication elements; and
one or more infill panels in which flexible supply channels are retained,
wherein the function and infill panels, lined up spaced apart from each other, are guided in a rail system of a PSC (Passenger Service Channel) channel so that they are slidable in the direction of flight, wherein the PSC channel is arranged above passenger seat rows, wherein the function panels are individually positioned in the PSC channel relative to the passenger seat rows, and wherein the infill panels comprise a flexible length compensation element that synchronously follows an actuating movement of the function panels to automatically compensate for a distance dimension $S_1$ between two function panels that are positioned so as to be spaced apart from each other.

16. The aircraft of claim 15,
wherein the one or more of comfort elements, operating elements, visual display elements, and communication elements comprise one or more of a reading light, steward call button, air nozzle, oxygen mask and communication device.

17. A method for arranging and installing panels of a supply device in a PSC (Passenger Service Channel) channel of an aircraft passenger cabin comprising:
individually positioning, relative to passenger seat rows, one or more function panels comprising one or more comfort elements, operating elements, visual display elements and communication elements; and
compensating for a distance dimension $S_1$ between two function panels that are positioned so as to be spaced apart from each other, or between an end panel and a function panel by providing an infill panel comprising flexible supply channels, wherein the infill panel synchronously follows movements of the function panel by flexible length adjustment.

18. The supply device of claim 1, wherein the infill panels comprise:
a roller blind with a flexible fabric panel starting from a transverse brace, said roller blind further comprising first and second tensioning brackets spaced apart from each other, said tensioning brackets being individually adjustable in a linear manner,
wherein on the rail-system side, the fabric panel comprises two fabric panel ends that by way of a spring connection are connected to the transverse brace so as to be elastically pre-tensioned.

19. The supply device of claim 18, wherein at least one of the first and second tensioning brackets of the infill panels is attached to the function panel by attachment pins.

20. The supply device of claim 18, wherein the function panel comprises a substantially concave retainer, and wherein at least one of the first and second tensioning brackets of the infill panel engages said retainer with a clearance.

21. The supply device of claim 18, wherein each of the first and second tensioning brackets of the infill panel is supported on at least one gliding element that is associated with the retainer of the function panel.

22. The supply device of claim 18, wherein the fabric panel of at least some infill panels inserted in the PSC channel vary in at least one of color and structure.

23. The supply device of claim 18, wherein the material of the fabric panel of the infill panel meets the criteria of DIN 4102 for the fire classification B1.

24. The supply device of claim 1, wherein the panels aligned in the PSC channel are arranged underneath baggage compartments that are arranged in the upper region of the cabin.

25. The supply device of claim 18, wherein a pusher device of the infill panels connects the first and second tension brackets with the transverse brace.

26. The supply device of claim 25, wherein the pusher device comprises a plurality of compression bars each of which, by way of joints, are connected to one of the first and second tensioning brackets at a first end and to an actuator element integrated in the transverse brace at a second end, wherein each actuator element is associated with a spring element.

* * * * *